United States Patent
Pipes et al.

(10) Patent No.: US 10,777,331 B2
(45) Date of Patent: Sep. 15, 2020

(54) PROCESSES FOR GENERATING GERMANIUM-68 WITH REDUCED VOLATILES

(71) Applicant: Mallinckrodt Nuclear Medicine LLC, Maryland Heights, MO (US)

(72) Inventors: David Pipes, Wildwood, MO (US); William Uhland, St. Charles, MO (US); Melissa Perrigo, Herculaneum, MO (US); Mark Owens, Maryland Heights, MO (US)

(73) Assignee: Curium US LLC, St. Louis, MO (US)

( * ) Notice: Subject to any disclaimer, the term of this patent is extended or adjusted under 35 U.S.C. 154(b) by 200 days.

(21) Appl. No.: 15/806,517

(22) Filed: Nov. 8, 2017

(65) Prior Publication Data

US 2018/0137947 A1 May 17, 2018

Related U.S. Application Data

(60) Provisional application No. 62/420,959, filed on Nov. 11, 2016.

(51) Int. Cl.
| | | |
|---|---|---|
| *G21G 1/00* | (2006.01) | |
| *B01J 39/09* | (2017.01) | |
| *B01J 39/02* | (2006.01) | |
| *G21G 1/10* | (2006.01) | |
| *G21G 1/12* | (2006.01) | |

(Continued)

(52) U.S. Cl.
CPC .............. *G21G 1/001* (2013.01); *B01J 39/02* (2013.01); *B01J 39/09* (2017.01); *G21G 1/10* (2013.01); *G21G 1/12* (2013.01); *C22B 3/004* (2013.01); *C22B 41/00* (2013.01); *C22B 58/00* (2013.01);

(Continued)

(58) Field of Classification Search
CPC ...................................... G21G 4/08; G21G 1/001; G21G 1/10; G21G 1/12; G21G 2001/0021; G21G 2001/0094; C22B 41/00; C22B 58/00; C22B 3/004; B01J 39/02; B01J 39/09
See application file for complete search history.

(56) References Cited

U.S. PATENT DOCUMENTS

| | | |
|---|---|---|
| 3,329,584 A | 7/1967 | Mehalchick |
| 4,351,821 A | 9/1982 | Boudot et al. |

(Continued)

FOREIGN PATENT DOCUMENTS

| | | |
|---|---|---|
| CN | 102552268 A | 7/2012 |
| CN | 102349874 B | 4/2013 |

(Continued)

OTHER PUBLICATIONS

Razbash, A. A., N. A. Konyakhin, and N. N. Krasnov. "Production of germanium-68 in Russia." Abstract from the Sixth Workshop on Target and Target Chemistry, Vancouver BC, CA. 1995. (Year: 1995).*

(Continued)

*Primary Examiner* — Lily C Garner
(74) *Attorney, Agent, or Firm* — Armstrong Teasdale LLP

(57) ABSTRACT

Processes for producing germanium-68 from a gallium target body are disclosed. In some embodiments, germanium-68 and gallium are precipitated to remove metal impurities. Germanium-68 and gallium are re-dissolved and loaded onto an ion exchange column to separate germanium-68 from gallium.

16 Claims, 5 Drawing Sheets

(51) Int. Cl.
*G21G 4/08* (2006.01)
*C22B 41/00* (2006.01)
*C22B 3/26* (2006.01)
*C22B 58/00* (2006.01)

(52) U.S. Cl.
CPC ....... *G21G 4/08* (2013.01); *G21G 2001/0021* (2013.01); *G21G 2001/0094* (2013.01)

(56) References Cited

U.S. PATENT DOCUMENTS

| | | | |
|---|---|---|---|
| 4,400,360 | A | 8/1983 | Nalewajek |
| 5,190,735 | A | 3/1993 | Phillips et al. |
| 5,196,412 | A | 3/1993 | Bradley et al. |
| 6,007,790 | A | 12/1999 | Bedard et al. |
| 6,894,051 | B1 | 5/2005 | Zimmermann et al. |
| 7,018,565 | B2 | 3/2006 | Tian et al. |
| 7,179,869 | B2 | 2/2007 | Hirokane et al. |
| 7,544,799 | B2 | 6/2009 | Zimmermann et al. |
| 7,816,359 | B2 | 10/2010 | Loiseleur et al. |
| 7,879,860 | B2 | 2/2011 | Mutz |
| 7,893,076 | B2 | 2/2011 | Mutz |
| 8,143,356 | B2 | 3/2012 | Ogawa et al. |
| 8,170,172 | B2 | 5/2012 | Uhland |
| 8,361,303 | B2 | 1/2013 | Jambunathan et al. |
| 8,524,018 | B2 | 9/2013 | Busky et al. |
| 8,715,611 | B2 | 5/2014 | Kang et al. |
| 8,932,876 | B2 * | 1/2015 | Cutler .................. B01D 15/362 436/174 |
| 9,272,919 | B2 | 3/2016 | Larlus et al. |
| 2006/0012287 | A1 | 1/2006 | Tian et al. |
| 2007/0207075 | A1 | 9/2007 | Fassbender |
| 2010/0275734 | A1 * | 11/2010 | Langstrom ........... C01G 15/003 75/721 |
| 2011/0114075 | A1 | 5/2011 | Mills |
| 2012/0011965 | A1 * | 1/2012 | Li ........................ B01D 15/361 75/393 |
| 2012/0122017 | A1 | 5/2012 | Mills |
| 2013/0245349 | A1 | 9/2013 | Larlus et al. |
| 2013/0295712 | A1 | 11/2013 | Chen et al. |
| 2014/0369903 | A1 | 12/2014 | Cutler et al. |
| 2015/0003576 | A1 | 1/2015 | Uhland et al. |
| 2015/0010447 | A1 * | 1/2015 | Li ........................ C22B 3/0004 423/112 |
| 2015/0232392 | A1 | 8/2015 | Chi et al. |
| 2016/0189816 | A1 * | 6/2016 | Czerwinski ............. G21G 1/08 376/189 |

FOREIGN PATENT DOCUMENTS

| | | |
|---|---|---|
| CN | 102382994 B | 8/2013 |
| EP | 0644227 B1 | 7/2003 |
| WO | 2005089912 A1 | 9/2005 |
| WO | 2013176522 A1 | 11/2013 |
| WO | 2014109463 A1 | 7/2014 |
| WO | 2014115082 A1 | 7/2014 |
| WO | 2014210352 A1 | 12/2014 |

OTHER PUBLICATIONS

Mirzadeh, S., and R. Lambrecht. "Radiochemistry of germanium." Journal of Radioanalytical and Nuclear Chemistry 202.1-2 (1996): 7-102. (Year: 1996).*

Rösch, F. "Past, present and future of 68Ge/68Ga generators." Applied Radiation and Isotopes 76 (2013): 24-30. (Year: 2013).*

Karpeles, Alfredo. "Herstellung eines 68Ga-generators." Radiochimica Acta 12.1 (1969): 22-25. Human translation provided. (Year: 1969).*

Métayé, Thierry, et al. "The presence of sodium nitrate in generator eluate decreases the radiochemical purity of 99mTc-Sestamibi." Journal of nuclear medicine technology 40.3 (2012): 187-193. (Year: 2012).*

Bokhari, T. H. et al., "Concentration of 68Ga via solvent extraction", Applied Radiation and Isotopes 67 (2009) pp. 100-102.

Shealy, C. N. et al., "Gallium-68 as a Scanning Agent for Intracranial Lesions", J. Nucl. Med. 5 (1964) pp. 161-167.

Gleason, G. I., "A Positron Cow", Int. J. of App. Rat Isotopes 8 (1960) pp. 90-94.

Fitzsimmons, J. M. et al., "Production scale purification of Ge-68 and Zn-65 from irradiated gallium metal", Applied Radiation and Isotopes 101 (2015) pp. 60-64.

Razbash, A. A. et al., "Production of germanium-68 in Russia," Proc. 6th Workshop on Targetry and Target Chemistry, Vancouver, Candada (Oct. 1, 1996) pp. 99-100.

* cited by examiner

PROCESSES FOR GENERATING GERMANIUM-68 WITH REDUCED VOLATILES

CROSS-REFERENCE TO RELATED APPLICATION

This application claims the benefit of priority to U.S. Provisional Application Ser. No. 62/420,959, filed on Nov. 11, 2016, which is hereby incorporated by reference in its entirety.

FIELD OF THE DISCLOSURE

The field of the disclosure relates to processes for producing germanium-68 from a gallium target body. The processes use various extraction techniques that may reduce the amount of volatile compounds produced during extraction.

BACKGROUND

Positron emission tomography (PET) is an imaging method that uses positron emitting radiotracers to track the biochemical, molecular, and/or pathophysiological processes in humans and animals. In PET systems, positron-emitting isotopes serve as beacons for identifying the exact location of diseases and pathological processes under study without surgical exploration of the human body. With these non-invasive imaging methods, the diagnosis of diseases may be more comfortable for patients, as opposed to the more traditional and invasive approaches, such as exploratory surgeries.

One such exemplary radiopharmaceutical agent group includes gallium-68 (Ga-68), which may be obtained from the radioisotope germanium-68 (Ge-68). Germanium-68 has a half-life of about 271 days, decays by electron capture to Ga-68, and lacks any significant photon emissions. Gallium-68 decays by positron emission. These properties make gallium-68 an ideal radioisotope for calibration and transmission sources. Thus, the availability of the long-lived parent, germanium-68, is of significant interest because of its generation of the shorter-lived gallium radioisotope.

Germanium-68 may be obtained by irradiating a target body containing gallium to cause gallium-69 within the target body to transmute to germanium-68 by the (p, –2n) reaction. Germanium is conventionally stripped from the target body by contacting the target body by an acidic mixture comprising hydrochloric acid. Germanium may be extracted from the stripped solution by use of non-polar solvents and hydrochloric acid.

Use of halides during stripping and extraction of germanium-68 allows volatile germanium halide compounds (e.g., $GeCl_4$) to form. Such volatile germanium-68 compounds may evaporate from the liquid phase causing yield loss and contamination.

A need exists for processes for stripping and extracting germanium-68 with high yield and with reduced formation of volatile germanium halide compounds.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a process for generating germanium-68. A target body including gallium is bombarded. The bombardment of the target body produces germanium-68 within the target body. The bombarded target body is stripped with an acidic mixture to create a stripped solution comprising gallium and germanium-68. Gallium and germanium-68 are precipitated from a precipitation solution to separate gallium and germanium-68 from impurity metals in the precipitation solution.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Provisions of the present disclosure relate to methods for generating germanium-68 from a target body. The methods may involve use of less halides such as chloride, bromide, iodide and/or fluoride which form volatile germanium compounds which cause loss of germanium-68 through evaporation.

A. Target Body

Figure 1:
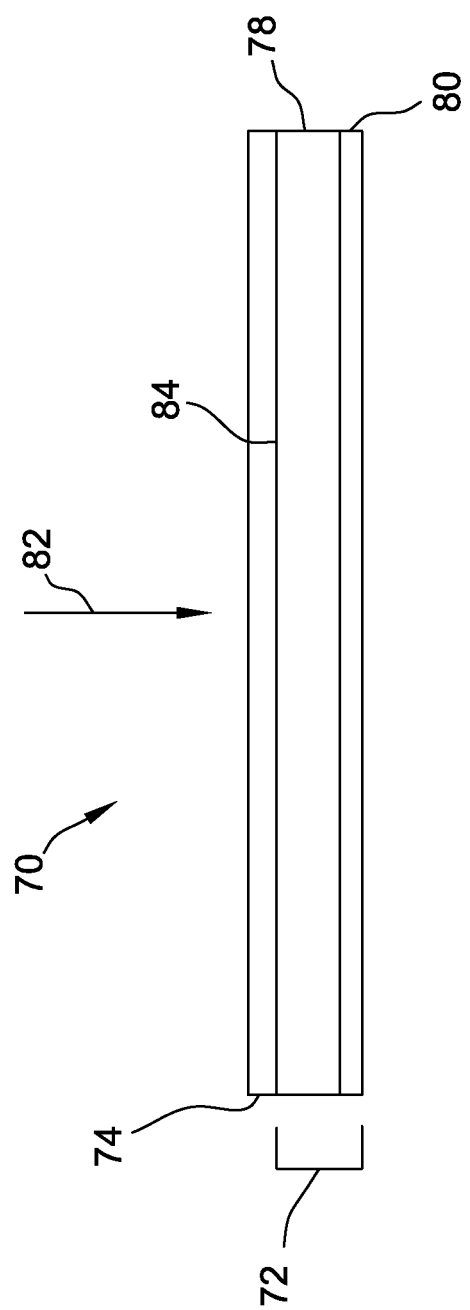
FIG. 1 is a cross-section side view of a target body for producing a radioisotope.
Figure 2:
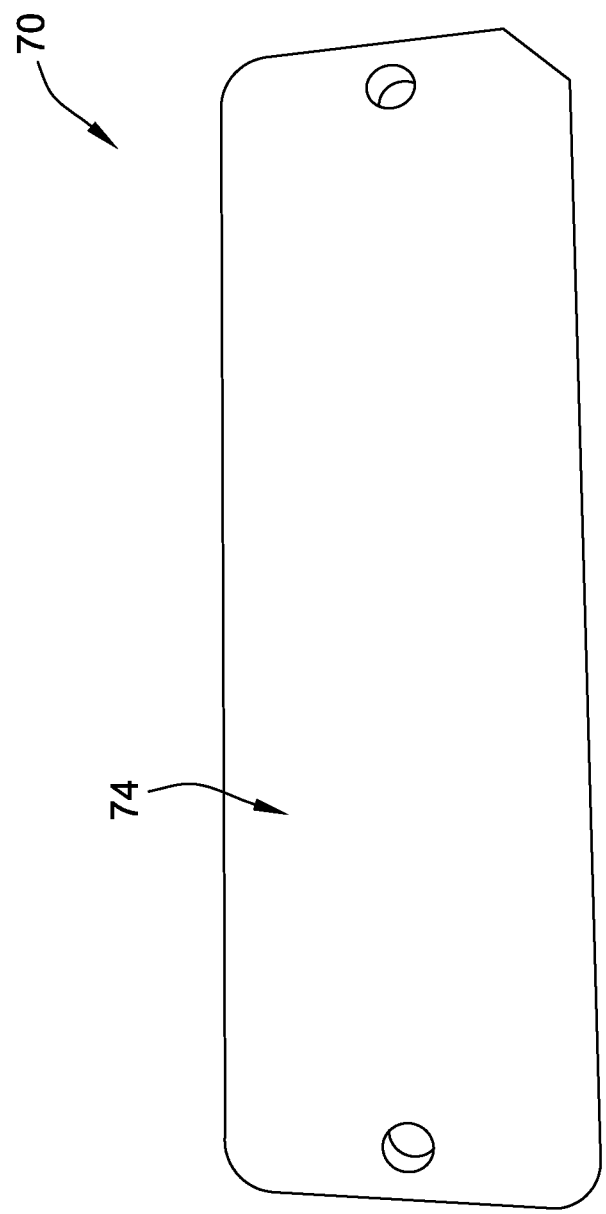
FIG. 2 is a perspective front view of the target body.
Figure 3:
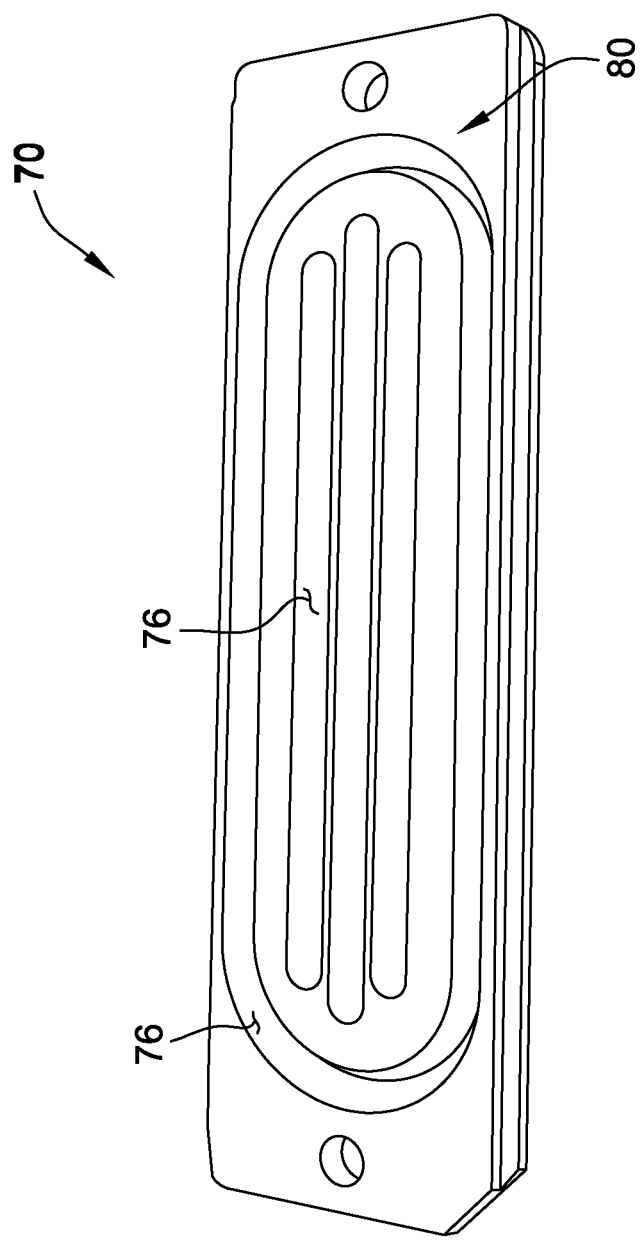
FIG. 3 is a perspective rear view of the target body.

In an embodiment of the present disclosure, a target body is shown in FIGS. 1-3 and generally referenced as "70". The target body 70 is used for the production of a radioisotope, such as Ge-68. The target body 70 is used during the bombardment process to produce the radioisotope from a starting material. It should be noted that the target body 70 shown in FIGS. 1-3 is exemplary and other targets for producing Ge-68 may be used.

In some embodiments of the present disclosure, only one target body 70 is used in the bombardment process. In other embodiments, two (dual) target bodies are used in the bombardment process, though more than two is contemplated. When dual target bodies are used in the bombardment process, a greater amount of the target radioisotope, such as Ge-68, may be recovered at the end of the process. When dual target bodies are used, each target body 70 may include the same or different amounts of the radioisotope starting material as disclosed elsewhere in this disclosure.

Similarly, the construction of the dual target bodies may be such that the target bodies have identical structures and components, for example.

The target body 70 includes a surface layer 74 (FIG. 1) comprising a radioisotope starting material which is irradiated by charged particles (indicated generally by arrow 82) to produce the radioisotope. In turn, the radioisotope may be used alone or in combination with other substances (e.g., tagging agents) as a radiopharmaceutical for medical diagnostic or therapeutic purposes.

The surface layer is supported by a target substrate plate 72. The plate 72 of the target body 70 may include a metal, such as copper, aluminum, nickel and/or other conductive material(s). In some embodiments, the metal is copper. The plate 72 may include two or more layers with the layer 78 contacting the surface layer 74 being the metal. For example, the base layer 72 may be molded out of a supporting aluminum layer 80 and then coated with an intermediate copper layer 78. The target 70 may be produced by depositing the surface layer 74 (FIG. 1) on the front surface 84 of the target substrate plate 72.

Being conductive, the plate 72 of the target body 70 may be adapted to transfer heat efficiently away from the target body 70 as temperature increases while the target body 70 is irradiated. One or more cooling channels 76 (FIG. 3) may be formed in plate 72 for cooling during irradiation. The cooling channels 76 facilitate fluid flow along the target body 70 so that heat may be removed from the target body 70 while the target body 70 is irradiated with charged particles.

In embodiments of the present disclosure, the target body 70 includes from about 0.5 grams to about 5.0 grams of the radioisotope starting material. As an example, the starting material may be provided in powder form and thereafter pressed into the target body 70.

In some embodiments of the present disclosure, the starting material includes an alloy comprising gallium. The alloy may include from about 10% to about 80% or from about 60% to about 75% gallium, by weight of the alloy. The alloy may also include a base-metal selected from the group consisting of nickel, indium, tin, iron, ruthenium, osmium, chromium, rhenium, molybdenum, tungsten, manganese, cobalt, rhodium and combinations thereof. The metal may be present in the alloy in an amount of from about 20% to about 90% or, as in some embodiments, from about 25% to about 40%, by weight of the alloy.

In some embodiments of the present disclosure, the alloy includes gallium and nickel. In these embodiments, the gallium-nickel alloy includes from about 60% to about 75% gallium and from about 25% to about 40% nickel, by weight of the alloy. In one embodiment, the gallium-nickel alloy includes about 60% gallium and about 40% nickel, by weight of the alloy. In another embodiment, the gallium-nickel alloy includes about 61% gallium and about 39% nickel, by weight of the alloy.

The base layer 72 of the target body 70 may include a metal, such as copper, aluminum, nickel and/or other conductive material(s). For example, the base layer 72 may be molded out of aluminum and then coated with copper. Being conductive, the base layer 72 of the target body 70 may be adapted to transfer heat efficiently away from the target body 70 as temperature increases while the target body 70 is irradiated. Further, in some embodiments, a cooling channel 76 may be formed as part of a channel or groove lengthwise along the target body 70. The cooling channel 76 facilitates fluid flow along the target body 70 so that heat may be removed from the target body 70 while the target body 70 is irradiated with charged particles.

During bombardment of the target body 70, nuclear interactions between the colliding charged particles and atomic nuclei of materials of the target body 70 may transmute a portion of those nuclei into radioisotopes. For example, when the target body 70 includes gallium, after bombardment, the base layer 72 may include germanium radioisotopes, such as Ge-68, Ge-69, and Ge-71. The base layer 72 may also include other radioisotopes after bombardment, such as Cu-62, Cu-64, Cu-61, Cu-60, Zn-62, Zn-63, Zn-65, Co-57, Co-58, Co-56 and/or Cr-51.

B. Bombardment

In accordance with embodiments of the present disclosure, the target body 70 including the starting material is irradiated via bombardment. The bombardment of the starting material can produce a radioisotope within the target body 70. In various embodiments of the present disclosure, a gallium-nickel alloy is the starting material and germanium radioisotopes are produced during bombardment.

An exemplary method of irradiation is by proton bombardment. In some embodiments of the present disclosure, the target body 70 is bombarded by a particle accelerator. For example, the proton bombardment can be accomplished by inserting the target body 70 into a linear accelerator beam at a suitable location whereby the target is bombarded at an integrated beam intensity. In some embodiments of the present disclosure, the target body 70 is bombarded with a beam current of from about 50 micro-amperes to about 350 micro-amperes. In some embodiments, the target body 70 is bombarded at a beam energy of from about 20.0 MeV to about 40.0 MeV.

Figure 4:
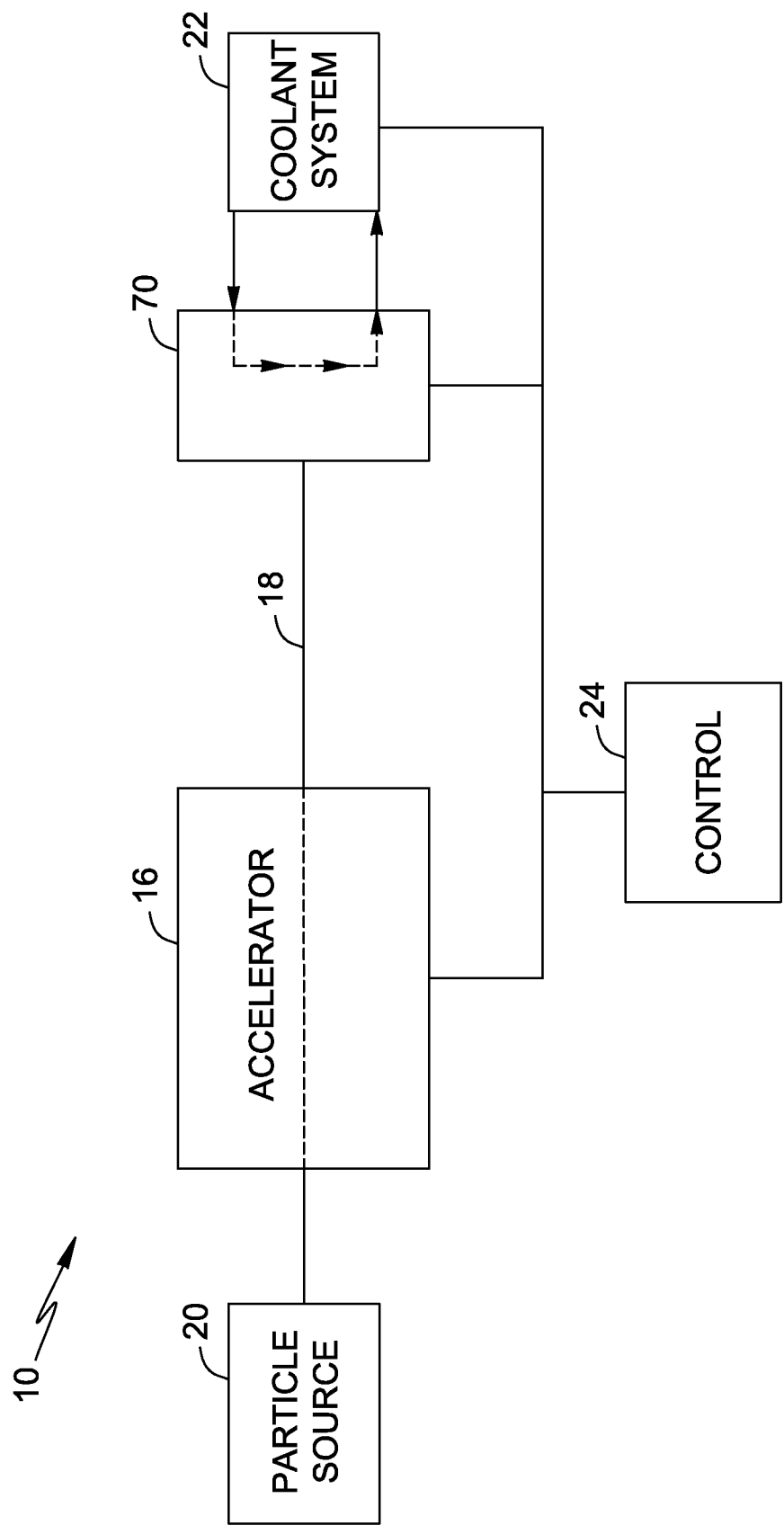
FIG. 4 is a schematic of a particle accelerating system.

Turning now to FIG. 4, a block diagram of an exemplary particle accelerating system 10 is disclosed. The system 10 includes an exemplary target body 70 having multiple layers, at least one of which is adapted for producing a radioisotope when that layer is irradiated with energetic charged particles. The target body 70 includes a radioisotope starting material, which may produce a radioisotope when bombarded or irradiated with the energetic charged particles. In turn, the radioisotope may be used alone or in combination with other substances (e.g., tagging agents) as a radiopharmaceutical for medical diagnostic or therapeutic purposes. The target body 70 may include a radioisotope starting material, such as a gallium-nickel alloy.

The target body 70 may include a metal, such as copper, aluminum, nickel and/or other conductive material(s). The target body 70 may be adapted to transfer heat efficiently away from the target body 70 as temperature increases while the target body 70 is irradiated.

The particle accelerating system 10 includes a particle accelerator 16 configured to accelerate charged particles, as shown by line 18. The charged particles 18 accelerate to attain enough energy to produce radioisotope material once the particles 18 collide with the target body 70. Thus, target body 70 may include a mixture of radioisotope and radioisotope starting material. Production of the radioisotope is facilitated through a nuclear reaction occurring once the accelerated particles 18 interact with the starting material target body 70. For example, when producing radioisotope Ge-68, a gallium-nickel alloy may be irradiated with protons 18 accelerated via the accelerator 16. The protons 18 may originate from a particle source 20 that injects the charged particles 18 into the accelerator 16 so that the particles 18 may be accelerated towards the target body 70.

As the accelerated charged particles 18 collide with the target body 70, a substantial amount of the particles' kinetic energy may be absorbed by the target body 70. Absorption of the energy imparted by the accelerated particles 18 may cause the target body 70 to heat up. To mitigate overheating of the target body 70, the target body 70 may be coupled to a coolant system 22 disposed adjacent to the target body 70. The coolant system 22 may include fluid connectors that are fluidly coupled to the target body 70 so that fluid, such as water, may circulate along or through the target body 70, thereby removing heat absorbed by the target body 70 during irradiation of the target body. In the illustrated embodiment, the coolant system 22 is shown as being separate from the target body 70 and disposed behind the target body 70. In other embodiments, the cooling system 22 may be part of the target body 70, or it may be disposed remote from the target body 70.

The particle accelerating system 10 includes a control system 24 coupled to the particle accelerator 16, the target body 70, and/or the coolant system 22. The control system 24 may be configured to, for example, control parameters, such as accelerating energy of the particles 18, current magnitudes of the accelerated charged particles 18, and other operational parameters relating to the operation and functionality of the accelerator 16. The control system 24 may be coupled to the target body 70 to monitor, for example, the temperature of the target body 70. The control system 24 may be coupled to the coolant system 22 to control temperature of the coolant and/or monitor and/or control flow rate.

Figure 5:
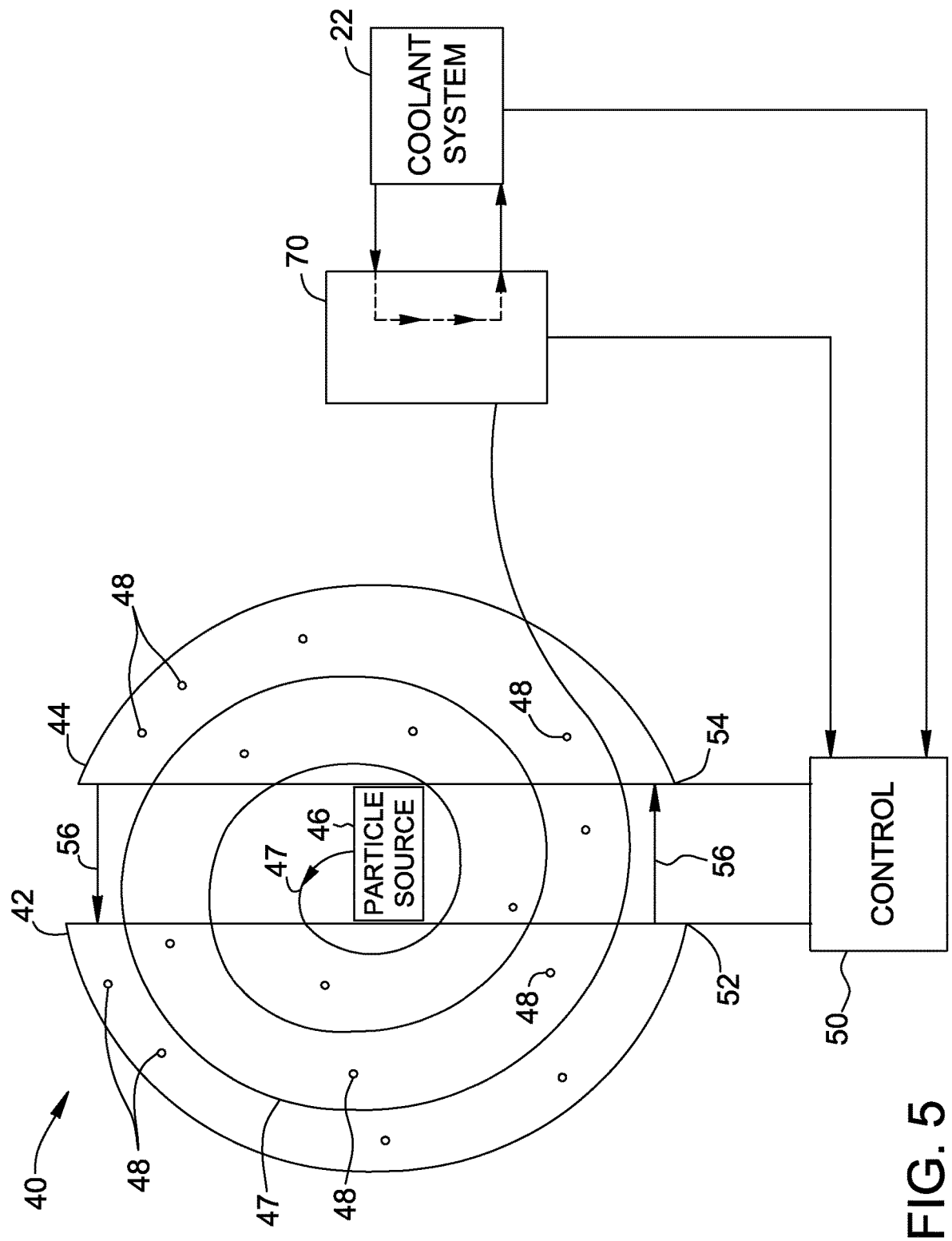
FIG. 5 is a schematic of a cyclotron of the particle accelerator system.

In some embodiments of the present disclosure, the particle accelerator 16 is a cyclotron. A cyclotron can accelerate charged particles to high speeds and cause the charged particles to collide with a target to produce a nuclear reaction and subsequently create a radioisotope. Referring now to FIG. 5, an exemplary particle accelerator 40 is illustrated for use with the target body 70. The particle accelerator 40 may include a cyclotron used for accelerating charged particles, such as protons. The cyclotron 40 may employ a stationery magnetic field and an alternating electric field for accelerating charged particles. The cyclotron 40 may include two electromagnets 42, 44 separated by a certain distance. Disposed between the electromagnets 42, 44 is a particle source 46. In some embodiments, the electromagnets 42, 44 may be pie-shaped or wedge-shaped. The particle source 46 emits charged particles 47 such that the particles' 47 trajectories begin at a central region disposed between the electromagnets 42, 44. A magnetic field 48 of constant direction and magnitude is generated throughout the electromagnets 42, 44 such that the magnetic field 48 may point inward or outward perpendicular to the plane of the electromagnets 42, 44. Dots 48 depicted throughout the electromagnets 42, 44 represent the magnetic field pointing inwardly or outwardly from the plane of electromagnets 42, 44. In other words, the surfaces of the electromagnets 42, 44 are disposed perpendicular to the direction of the magnetic field.

Each of the electromagnets 42, 44 may be connected to a control 50 via connection points 52, 54, respectively. The control 50 may regulate an alternating voltage supply, for example contained within the control 50. The alternating voltage supply may be configured to create an alternating electric field in the region between the electromagnets 42, 44, as denoted by arrows 56. Accordingly, the frequency of the voltage signal provided by the voltage supply creates an oscillating electric field between the electromagnets 42, 44. As the charged particles 47 are emitted from the particle source 46, the particles 47 may become influenced by the electric field 56, forcing the particle 57 to move in a particular direction, i.e., in a direction along or against the electric field, depending on whether the charge is positive or negative. As the charged particles 47 move about the electromagnets 42, 44, the particles 47 may no longer be under the influence of the electric field. However, the particles 47 may become influenced by the magnetic field pointing in a direction perpendicular to their velocity. At this point, the moving particles 47 may experience a Lorentz force causing the particles 47 to undergo uniform circular motion, as noted by the spiral paths 47 of FIG. 5. Accordingly, every time the charged particles 47 pass the region between the electromagnets 42, 44, the particles 47 experience an electric force caused by the alternating electric field, which increases the energy of the particles 47. In this manner, repeated reversal of the electric field between the electromagnets 42, 44 in the region between the electromagnets 42, 44 during the brief period the particles 47 traverse there through causes the particles 47 to spiral outward towards the edges of the electromagnets 42, 44.

Eventually, the particles 47 may impact a foil (not pictured) at a certain radius, which re-directs them tangentially into the target body 70. Energy gained while the particles 47 accelerate may be deposited into the target body 70 when the particles 47 collide with the target body 70. Consequently, this may initiate nuclear reactions within the target body 70, producing radioisotopes within the layer(s) of the target body 70. The control 50 may be adapted to control the magnitude of the magnetic field 48 and the magnitude of the electric field 56, thereby controlling the velocity and, hence, the energy of the charged particles as they collide with the target body 70. The control 50 may also be coupled to the target 70 and/or the coolant system 22 to control parameters of the target 70 and/or the coolant system 22 as described above with respect to FIG. 4.

In some embodiments of the present disclosure, the target body is bombarded for about 1 day, for about 3 days, for about 5 days, for about 7 days, for about 10 days, or for about 14 days. In one particular embodiment of the present disclosure, the target body is bombarded for about 4.4 days. The length of the bombardment can affect the radioisotope produced. In particular, prolonged bombardment of the target body will produce more of the targeted radioisotope. As used herein throughout this present disclosure, "prolonged" bombardment refers to bombardment that occurs for at least five days.

C. Decay Period

After the irradiation and bombardment of the target body, the target body is generally allowed to sit for a period of time whereby unwanted short-lived isotopes will decay. In some embodiments, the target body may be processed without any wait. When the target body is processed without any wait, however, there may be some purity issues that arise from lack of adequate time to allow the target body to decay. In some embodiments, the bombarded target body is allowed to decay for a period of time up and including about 6 days. In other embodiments, the bombarded target body is allowed to decay for a period of time up to and including about 7 days. In some embodiments, the bombarded target body is allowed to decay for a period of time up to and including about 14 days or more. During this decay time, short-lived materials such as, for example, Ge-69, Ge-71, Cu-62, Cu-64, Cu-61, Cu-60, Zn-62 and Zn-63, are allowed to decay away.

D. Stripping with Acidic Mixture

After the target body or bodies including the radioisotope are allowed to decay, the body or bodies are stripped with an acidic mixture. In some embodiments, the acidic mixture includes nitric acid ($HNO_3$). When the target body is stripped with this acidic mixture, the radioisotope starting material dissolves and a stripped solution is formed that includes $HNO_3$, dissolved starting material and the radioisotope(s). In some instances, water may also be present in the stripped solution. Stripping of the target body will also remove any copper from the target body. In the case of bombardment of gallium target bodies, the stripped solution may include $HNO_3$, gallium, germanium-68 as well as other isotopes (e.g., Ge-69 and Ge-71) and metals used in the target body such as copper and nickel. In some embodiments of the present disclosure, the acidic mixture that is used to strip the bombarded target body includes from about 4 M to about 15 M $HNO_3$ or from about 4 M to about 8 M $HNO_3$.

In some embodiments of the present disclosure, the acidic mixture also includes copper (II) nitrate ($Cu(NO_3)_2$). When this mixture is used, and, for example, a gallium-nickel alloy target body is used, a two-fold reaction can occur. First, the copper ions in the solution can electrochemically displace any gallium, nickel and germanium as shown in Reactions 1, 2 and 3:

Reaction 1—Single Displacement of Gallium with Copper $3Cu^{++}+2Ga°\rightarrow 3Cu°+2Ga^{+++}$ Reaction 2—Single Displacement of Nickel with Copper $Cu^{++}+Ni°\rightarrow Cu°+Ni^{++}$ Reaction 3—Single Displacement of Germanium with Copper $2Cu^{++}+Ge°\rightarrow 2Cu°+Ge^{++++}$.

After this displacement, the second reaction occurs, which involves the dissolution of the metallic copper formed in the nitric acid (as shown in Reaction 4), which in turn replenishes the copper (II) nitrate in the solution.

Reaction 4—Dissolution of Copper in Nitric Acid $3Cu°+8HNO_3\rightarrow 3Cu(NO_3)_2+2NO\uparrow+4H_2O$.

The amount of acidic mixture that can be used for the stripping procedure can range from about 20 ml to about 100 ml for a target mass of at least about 3 grams such as from about 3 grams to about 9 grams of the alloy mixture (e.g., from about 1 to about 50 ml/gram of the target alloy or from about 3 to about 25 ml/gram or from about 3 ml/gram to about 10 ml/gram of the target alloy). In some embodiments of the present disclosure, several successive rinses of about 10 ml each are used to strip the target body.

A charcoal vent may also be used during the stripping process. The charcoal vent includes a canister of activated charcoal that is attached to a vent hole in the top of a stripping cell used during the stripping process. The vent hole is the lone exit in from the stripping cell for any gases that may be generated during the stripping of the target body. Such gases that are generated must pass through the vent hole and are captured by the activated charcoal.

If dual target bodies (or even more than two target bodies) are bombarded and are being processed, the stripped solutions may be combined at the end of the stripping process prior to the subsequent extraction step. That is, each target body can be stripped separately by the process disclosed above and the two stripped solutions may be combined into one for the precipitation step. Alternatively, the stripped solutions may be processed separately in parallel precipitation steps.

E. Precipitation

After the bombarded target body including the radioisotope is stripped by the acidic mixture and forms a stripped solution, the radioisotope is precipitated from the stripped solution. In this step, the gallium starting material and the germanium-68 radioisotope are precipitated by adding ammonium hydroxide ($NH_4OH$). Without being bound to any particular theory, ammonium hydroxide reacts to form soluble copper, nickel, zinc (e.g., Zn-65) and cobalt (e.g., cobalt-57) amine complexes (which may be referred to herein as "impurity metals") and reacts to form insoluble (or partially insoluble) germanium hydroxide ($Ge(OH)_2$) and gallium hydroxide ($Ga(OH)_3$). The germanium hydroxide and gallium hydroxide precipitate from the solution and are separated from the soluble copper and nickel compounds.

Ammonium hydroxide may be added in a concentrated form (e.g., greater than about 25 wt %). In various embodiments, the amount of ammonium hydroxide used for precipitation may be from about 25 to about 100 ml/gram of the target alloy (e.g., from about 1 to about 50 ml/gram of the target alloy or from about 3 to about 25 ml/gram or from about 3 ml/gram to about 10 ml/gram of the target alloy).

In other embodiments, cyanide is added as a material to cause soluble copper and nickel amine complexes to form and to form insoluble germanium and gallium compounds.

After precipitation, the precipitates (e.g., gallium hydroxides and germanium hydroxide) are filtered from the solution. The remaining supernatant may contain various metals such as copper and nickel that do not precipitate or precipitate to a lesser extent than gallium and germanium hydroxides. The precipitate may be washed (e.g., about 0.15 M $NH_4OH$ or dilute cyanide) after separation from the supernatant.

In some embodiments, the precipitated starting material and precipitated radioisotope are re-dissolved in nitric acid. For example, nitric acid at a concentration from about 5 M to about 16 M and a volume of 20 ml to about 100 ml or from about 40 ml to about 70 ml may be used to wash the precipitate (e.g., from about 1 to about 50 ml/gram of the target alloy or from about 3 to about 25 ml/gram or from about 3 ml/gram to about 10 ml/gram of the target alloy).

A second precipitation step (which may be referred to herein as a subsequent dissolution-precipitation step) may be performed to further separate metals such as copper and nickel from the gallium starting material and germanium-68 radioisotope. The dissolution and precipitation steps may be repeated utilizing additional cycles until the desired purity is achieved (e.g., third, fourth, fifth or even more dissolution-precipitation steps). After the final precipitation step, the precipitate may be washed with water to remove amines from the precipitate.

F. Ion Exchange

The precipitated gallium hydroxide and germanium-68 hydroxide may be re-dissolved in nitric acid (e.g., 5 M to 15 M nitric acid; volume of from about 5 ml to about 100 ml or from about 5 ml to about 20 ml) to form an ion exchange feed solution. In some embodiments, the gallium and/or germanium-68 is at least partially dissolved, in other embodiments, the hydroxides are mostly dissolved (e.g., at least 90%, 95% or even 98% or more dissolved) and in other embodiments the hydroxides are completely dissolved. The ion exchange feed solution is contacted with an ion exchange resin to separate the radioisotope from the starting material. In some embodiments, the ion exchange resin is a cation exchange resin. In embodiments in which the target body staring material is gallium and the radioisotope is germanium-68, gallium ions (e.g., $Ga^{3+}$ binds to the resin)

and germanium (which may form a neutral complex Ge(OH)$_4$) passes through the cation exchange column. Other metals present in the ion exchange feed (e.g., iron) may be retained on the resin.

In some embodiments, the ion exchange resin is a strong cation exchange resin (e.g., DOWEX 50W-X8). The resin may contain sulfonated SO$_3$ sites for cation absorption. The resin may have any suitable mesh size (e.g., from about 50 to about 500 mesh or from about 100 to about 200 mesh). The column may have any length and diameter suitable for chromatographic separations of metals and metalloids (e.g., from about 1 cm to about 10 cm in diameter and/or from about 5 cm to about 50 cm in length). The flow rate through the column may be, for example, from about 0.1 ml/min to about 10 ml/min. The resin may be conditioned with water prior to addition of the ion exchange feed solution to pack the resin for fluid flow.

After the ion exchange feed solution is adsorbed onto the resin, dilute nitric acid (e.g., from about 0.01 M to about 1.0 M nitric acid) may be used as an eluent to remove germanium-68. A first cut of the eluate which contains little germanium (i.e., displaced water) may be discarded (e.g., about the first 10 to 100 ml, about the first 10 to 50 ml or about the first 30-40 ml). The remainder of the eluate (e.g., next 50 to 200 ml or 50 to 100 ml) is collected for further processing. The residence time of nitric acid on the column may range from as low as 5 minutes to up to about 8 hours (e.g., 15 minutes to 4 hours or 30 minutes to about 1 hour).

G. Washing and Final Processing

After the radioisotope has been recovered from the ion exchange column in the eluate stream, the eluate may be dried and washed with a solution not containing halides such as deionized water (e.g., from about 2 ml to about 30 ml of water that does not contain halides) to remove nitrates from the material. This washing step (drying and washing) may be performed in successive cycles until adequate nitrate removal is achieved (e.g., 2, 3, 4 or more times).

Optionally, the resulting aqueous solution of germanium-68 may be further purified by passing the solution through an anionic exchange resin such as a Waters (Milford, Mass.) WAX (weak anion exchange) or SAX (strong exchange) cartridge or exchange column. The cartridge or column may be first prepared by rinsing it with a water soluble organic solvent (i.e. methanol, ethanol, etc.) and then with water (e.g., about 5 to about 50 ml). The germanium-68 solution then may be passed through the cartridge or column with either pressure or vacuum applied. The collected germanium-68 solution then may be re-dried by transferring the solution to a beaker (glass or Teflon) and placing it on a heating block or hot plate set at greater than 100° C.

Once the solution is evaporated to dryness, the residue may be retaken up in the solution matrix of choice such as water, dilute acid (e.g., 0.001 to 2M HCl, nitric acid, acetic acid, sulfuric acid, formic acid, etc.), DTPA solution, EDTA solution, etc. The volume of dissolution may be, for example, from about 2 to about 30 ml. The final solution may be transferred to the final product container such as a glass vial or glass V-vial (conical bottom vial) or plastic vial or bottle.

In some embodiments, the amount of Ge-68 radioisotope that is obtained is from about 5 mCi to about 500 mCi or from about 15 mCi to about 120 mCi or from about 40 mCi to about 80 mCi (e.g., from about 1 to about 175 mCi/gram of target alloy or from about 10 to about 100 mCi/gram or 10 to about 50 mCi/gram of target alloy).

Preferably, the various process streams used to strip and extract the radioisotope (e.g., germanium-68) as described above do not contain halides so as to prevent volatile halide-radioisotope compounds from being formed. In some embodiments, the acidic mixture used to strip the radioisotope from the target body does not contain halides. Alternatively or in addition, the precipitation solution does not contain halides and/or the ion exchange feed solution does not contain halides and/or the washing solution does not contain halides. In some embodiments, each of the stripping solution, precipitation solution, ion exchange feed solution and washing solution does not contain halides. In some embodiments, the radioisotope (e.g., germanium-68) does not contact a halide (i.e., halogen containing solution) from the point of its formation on the target body to separation through the ion exchange column.

Compared to conventional methods for producing germanium-68, the methods of embodiments of the present disclosure have several advantages. By use of ammonium hydroxide as a precipitating agent, metals such as copper and nickel form soluble amine complexes while gallium and germanium form insoluble (or only partly soluble) hydroxides which precipitate from the solution. By using extraction steps which do not involve halides, formation of volatile germanium-68 compounds (e.g., $^{68}$GeX$_4$) may be reduced and yield of germanium-68 may be improved.

Examples

The processes of the present disclosure are further illustrated by the following Examples. These Examples should not be viewed in a limiting sense.

Example 1: Production of Germanium-68 from Target Body Upon Stripping and Precipitation Cyclotron target(s) with 1 to 4 grams of 61% Ga/39% Ni alloy was bombarded in a cyclotron and allowed to cool (decay) for greater than 3 weeks. The target/alloy was stripped twice with 20 ml 6M nitric acid/0.6M cupric nitrate solution. The strip solution was mixed slowly with 50 ml concentrated ammonium hydroxide forming a dark blue solution and precipitate mixture of gallium and germanium hydroxides. The solid was collected on a 0.2 μm filter. The solid was dissolved in 50 ml 10M nitric acid. Concentrated ammonium hydroxide was added to re-precipitate the gallium and germanium hydroxides. Solid was collected on a 0.2 μm filter. Solid was again dissolved in 50 ml 10M nitric acid. Concentrated ammonium hydroxide (50 ml) was added to re-precipitate the gallium and germanium hydroxides. Solid was collected on a 0.2 μm filter. The solid was a light blue-gray color. The solid was rinsed with 50 ml water. Solid was dissolved in 15 ml 10M nitric acid.

The solution was loaded onto a 100 ml volume (packed glass column) of cationic exchange resin (e.g., Dowex 50W-X8). After loading the solution onto the column, the column was eluted with 0.1M nitric acid. The first 40-50 ml off the column was discarded. The next 70 to 80 ml off of the column was collected and saved. The 70-80 ml solution containing the germanium-68 radioisotope was transferred to a 100 mL Teflon beaker and heated on a hot plate set at a temperature of at least 200° C. and the solution was slowly evaporated to dryness. After the solution was evaporated, the beaker containing the dried residue was heated for an additional 1 hour and then the beaker was removed from the hot plate and allowed to cool for at least 5 minutes. After cooling, a volume of water (5-30 mL) was added to the Teflon beaker to dissolve the solid residue. The beaker was swirled to improve dissolution of the residue in the beaker.

The water solution in the beaker was passed through a prepared strong anion exchange cartridge (e.g., Waters SAX cartridge) and the solution collected. The post-SAX cartridge solution was transferred to a 50 ml glass beaker, which was passivated by heating concentrated nitric acid in it, and the solution was heated on a hot plate at a temperature of at least 200° C. to evaporate to dryness. After the solution was evaporated, a volume of dilute hydrochloric acid (e.g., 2-30 ml 0.05M HCl) was added to the beaker. The solution was swirled to aid dissolution of the germanium-68. The solution was transferred to a glass vial and stoppered. The total quantity of germanium-68 radioactivity was determined as shown in Table 1 below.

TABLE 1

Germanium-68 Radioactivity in Product Solution

| Target Type | Germanium-68 in Target Stripping Solution | Total Product Yield of Germanium-68 | Final % Yield Germanium-68 |
|---|---|---|---|
| TR-30 | 223 mCi | 188 mCi | 84% |
| TR-30 | 232 mCi | 197 mCi | 85% |
| IBA | 230 mCi | 198 mCi | 86% |

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A process for generating germanium-68, the process comprising:
    bombarding a target body including gallium, wherein the bombardment of the target body produces germanium-68 within the target body; then
    stripping the bombarded target body with an acidic mixture to create a stripped solution comprising gallium and germanium-68; then
    adding ammonium hydroxide to the stripped solution to form a precipitation solution; and then
    precipitating gallium and germanium-68 simultaneously from the precipitation solution to separate gallium and germanium-68 from impurity metals in the precipitation solution, wherein germanium-68 forms a hydroxide that is precipitated from the precipitation solution and gallium forms a hydroxide that is precipitated from the precipitation solution.

2. The process as set forth in claim 1 further comprising contacting germanium-68 and gallium with an ion exchange resin to separate germanium-68 from the gallium.

3. The process as set forth in claim 1 or claim 2 wherein the stripped solution comprises nickel and copper, nickel and copper not precipitating with gallium and germanium-68 to separate nickel and copper from gallium and germanium-68.

4. The process as set forth in claim 1 or claim 2 wherein the acidic mixture comprises nitric acid.

5. The process as set forth in claim 1 or claim 2 wherein the acidic mixture comprises copper nitrate.

6. The process as set forth in claim 1 or claim 2 wherein the acidic mixture does not contain a halide.

7. The process as set forth in claim 2 wherein germanium-68 and gallium are dissolved in an ion exchange feed solution before contacting germanium-68 and gallium with the ion exchange resin, the ion exchange feed solution not comprising a halide.

8. The process as set forth in claim 7 wherein the ion exchange resin is a cation exchange resin.

9. The process as set forth in claim 1 or claim 2 wherein the precipitation solution does not contain a halide.

10. The process as set forth claim 1 wherein precipitation of gallium and germanium-68 is a first precipitation step, the process further comprising dissolving the precipitated gallium and germanium-68 and precipitating the dissolved gallium and germanium-68 in a second dissolution-precipitation step.

11. The process as set forth in claim 10 wherein gallium and germanium-68 are dissolved and re-precipitated in a third, fourth or fifth dissolution-precipitation step.

12. The process as set forth in claim 1 or claim 2 wherein the target body comprises an alloy comprising gallium.

13. The process as set forth in claim 12 wherein the alloy comprises a base-metal selected from the group consisting of nickel, indium, tin, iron, ruthenium, osmium, chromium, rhenium, molybdenum, tungsten, manganese, cobalt, rhodium and combinations thereof.

14. The process as set forth in claim 1 or claim 2 wherein the target body is bombarded with a particle accelerator.

15. The process as set forth in claim 2 wherein contacting germanium-68 and gallium with an ion exchange resin produces an eluate that comprises germanium-68, the process further comprising evaporating the eluate to dryness.

16. The process as set forth in claim 15 comprising washing the dried eluate to remove nitrates from the eluate.

* * * * *